Figure 5:
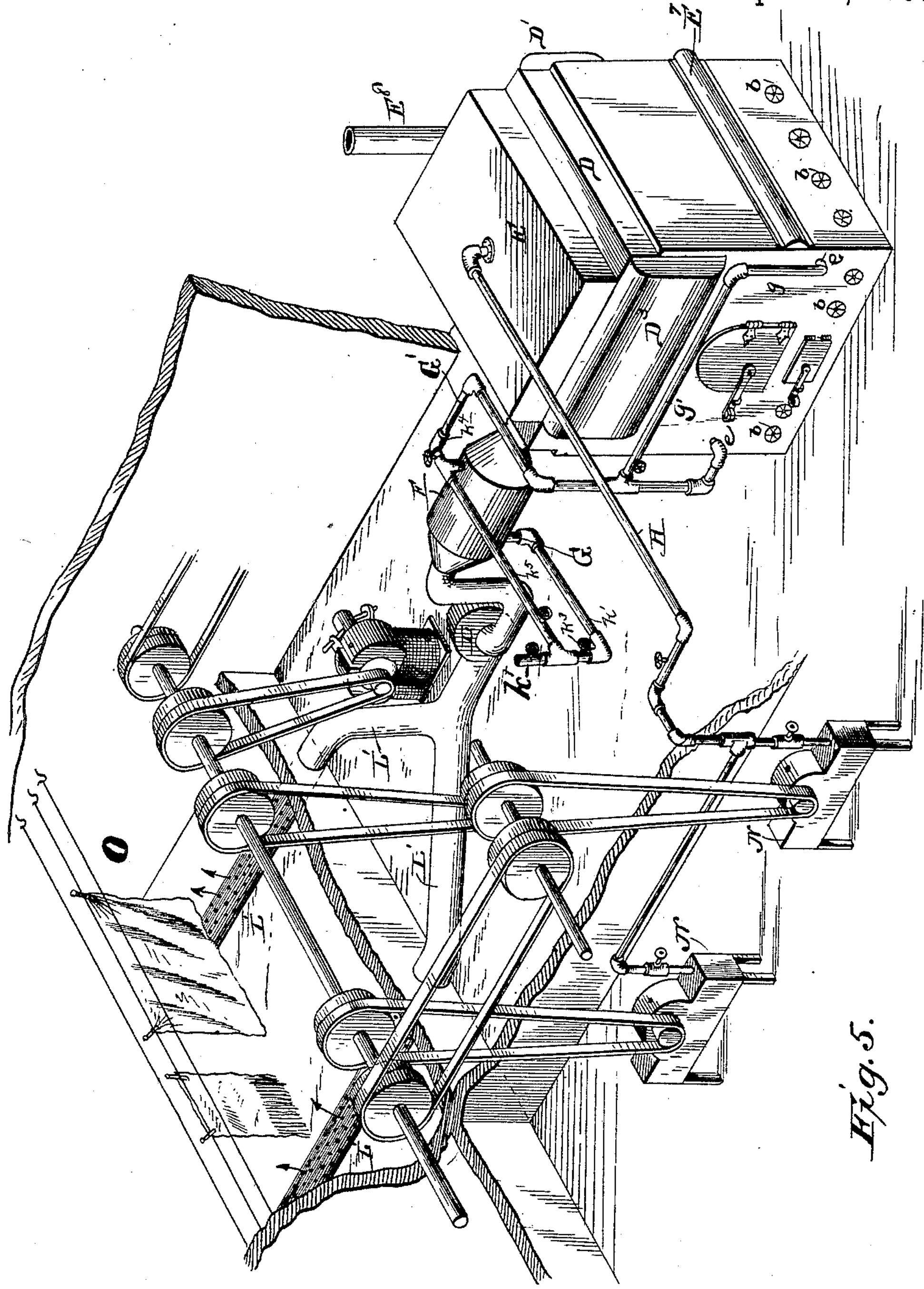

(No Model.) 4 Sheets—Sheet 1.
W. H. MURRAY.
DEVICE FOR TEMPERING AIR AND WATER.
No. 450,945. Patented Apr. 21, 1891.
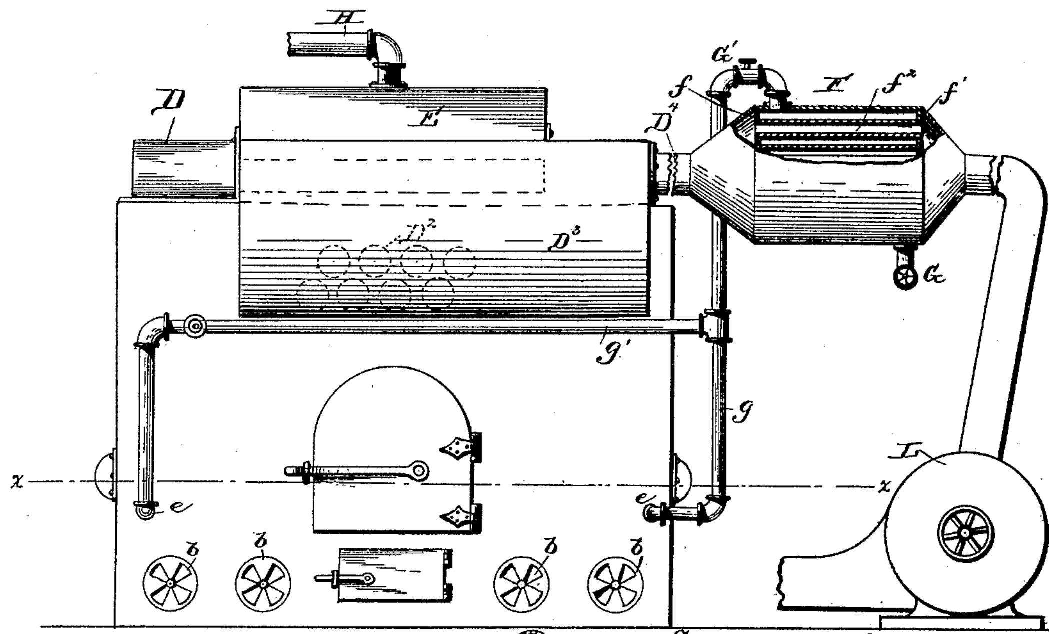
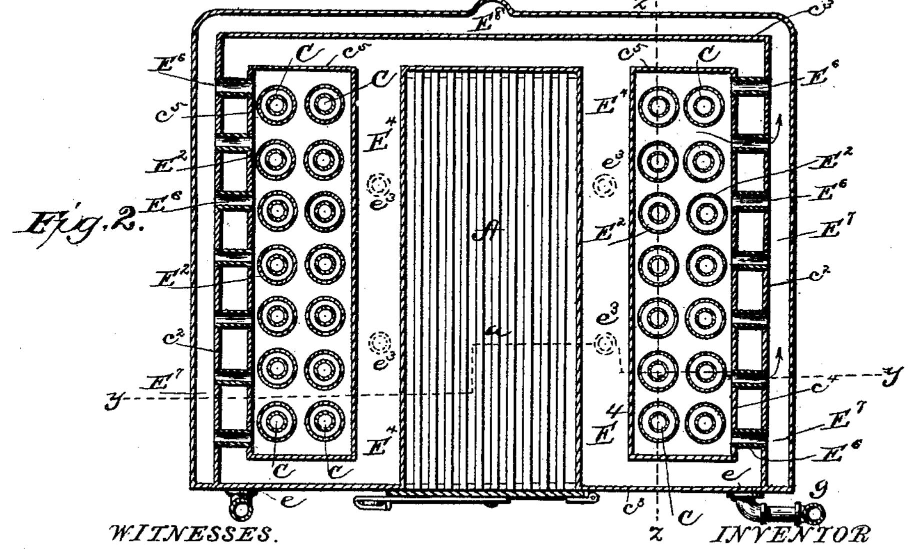
WITNESSES.
F. L. Ourand
H. A. Smith
INVENTOR
William H. Murray
by Doubleday & Bliss
Attorneys
THE NORRIS PETERS CO., PHOTO-LITHO., WASHINGTON, D. C.

(No Model.) 4 Sheets—Sheet 2.
W. H. MURRAY.
DEVICE FOR TEMPERING AIR AND WATER.
No. 450,945. Patented Apr. 21, 1891.
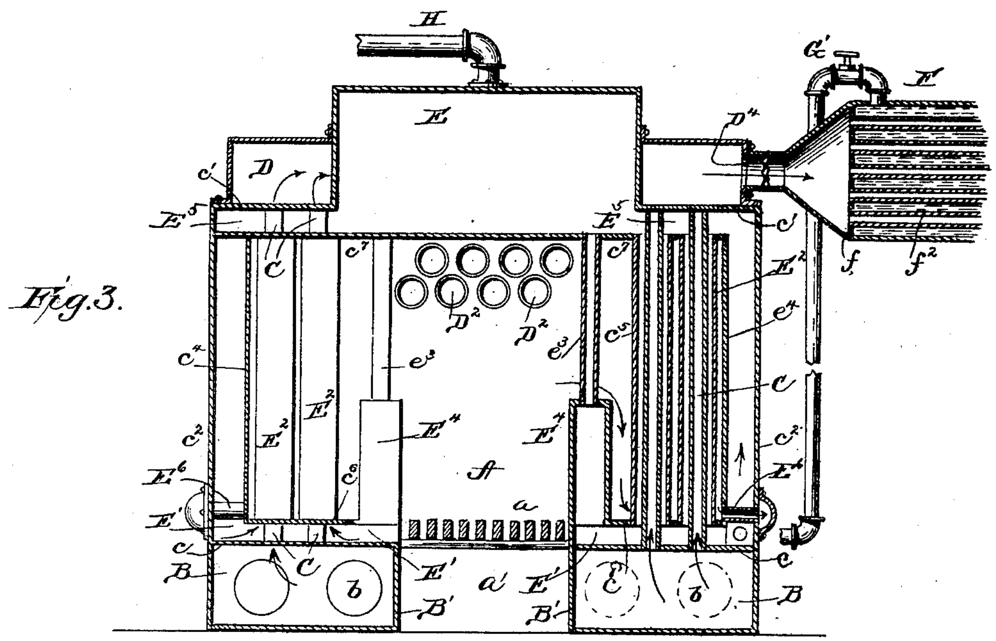
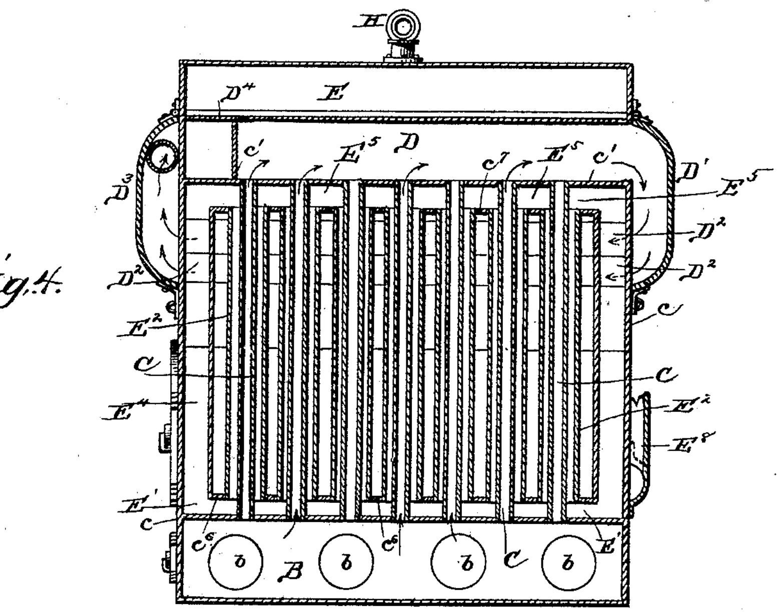
WITNESSES
F. L. Ourand.
W. A. Smith.
INVENTOR
William H. Murray
by Doubleday & Bliss
Attorney
THE NORRIS PETERS CO., PHOTO-LITHO., WASHINGTON, D. C.

(No Model.)

4 Sheets—Sheet 3.

W. H. MURRAY.

DEVICE FOR TEMPERING AIR AND WATER.

No. 450,945.

Patented Apr. 21, 1891.

WITNESSES

F. L. Ourand.

M. B. May.

INVENTOR

William H. Murray by Doubleday & Bliss

Attorney

THE NORRIS PETERS CO., PHOTO-LITHO., WASHINGTON, D. C.

(No Model.) 4 Sheets—Sheet 4.
W. H. MURRAY.
DEVICE FOR TEMPERING AIR AND WATER.
No. 450,945. Patented Apr. 21, 1891.
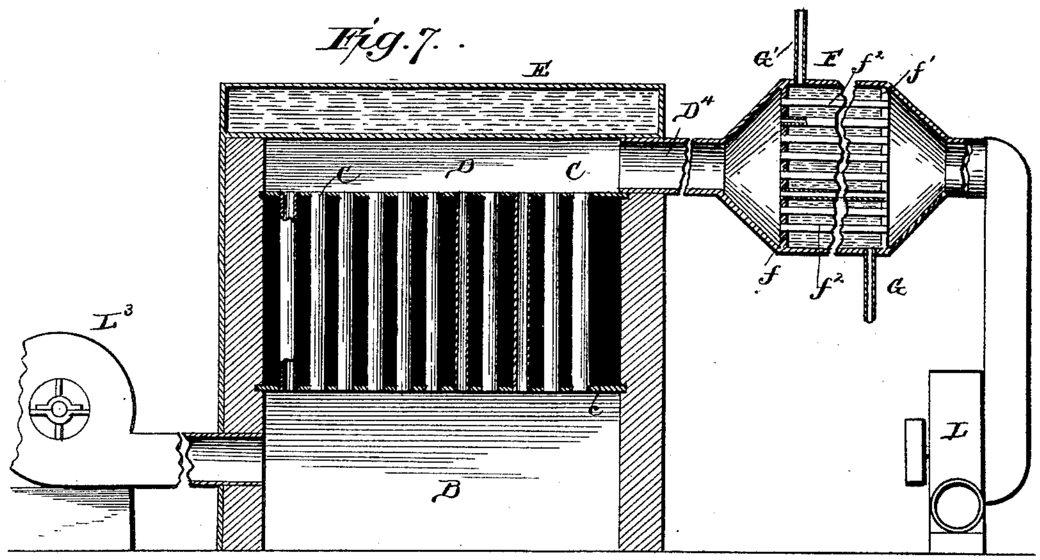
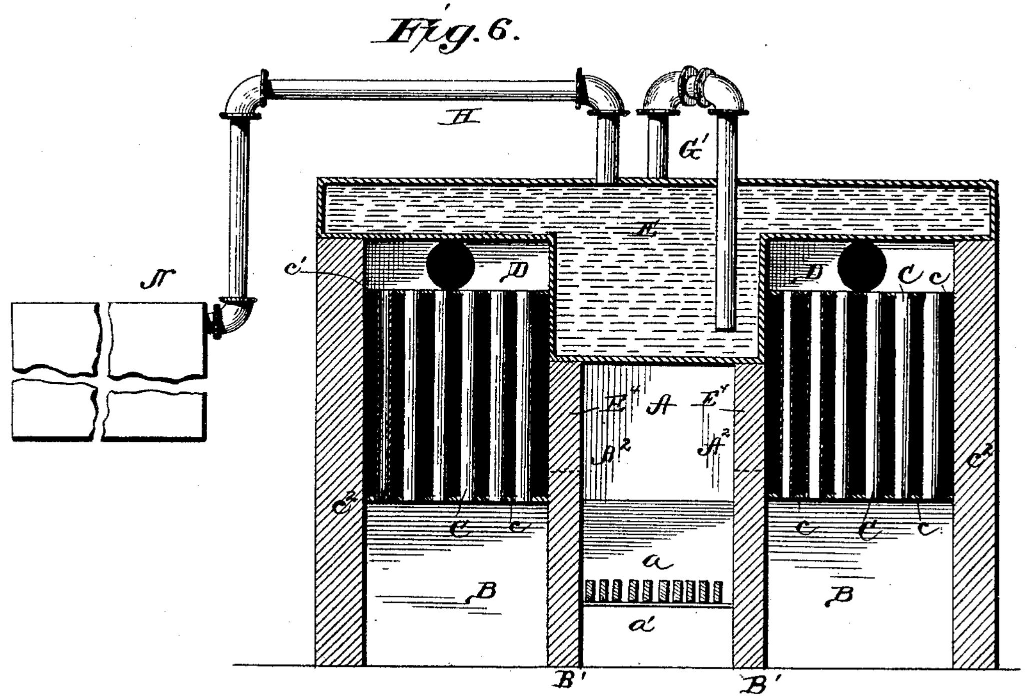
WITNESSES
F. L. Ourand.
W. A. Smith.
INVENTOR
William H. Murray
by Doubleday & Bliss
Attorneys
THE NORRIS PETERS CO., PHOTO-LITHO., WASHINGTON, D. C.

UNITED STATES PATENT OFFICE.

WILLIAM HENRY MURRAY, OF CHICAGO, ILLINOIS.

DEVICE FOR TEMPERING AIR AND WATER.

SPECIFICATION forming part of Letters Patent No. 450,945, dated April 21, 1891.

Application filed September 8, 1890. Serial No. 364,246. (No model.)

*To all whom it may concern:*

Be it known that I, WILLIAM HENRY MURRAY, a citizen of the United States, residing at Chicago, in the county of Cook and State of Illinois, have invented certain new and useful Improvements in Devices for Tempering Air and Water, of which the following is a specification, reference being had therein to the accompanying drawings.

This invention relates to an improved construction and arrangement of devices for treating air in respect to its temperature, and at the same time treating a body of water in respect to the same, the object being to initially apply a comparatively high heat to a body of air for the purpose of insuring that every particle thereof shall be elevated in temperature to the degree ultimately required, some of said air being raised to a higher degree, and subsequently subjecting it to a cooling action for the purpose of having it all brought to a uniform temperature, and in parallelism with the above utilize the surplus heat—that is, heat which at the high temperature used may not be carried away by the air—to raise the temperature of a body of water adjacent to the chambers in which the air is heated.

The invention also relates to providing a construction and arrangement of parts by which the devices that are subjected to the high heat of the fire shall be rendered more durable than in mechanisms of this sort as heretofore made.

In the drawings, Figure 1 is a front elevation of a heating or tempering mechanism embodying my improvements. Fig. 2 is a horizontal section on the line $x$ $x$, Fig. 1. Fig. 3 is a section on the line $y$ $y$, Fig. 2. Fig. 4 is a section on the line $z$ $z$, Fig. 2. Fig. 5 is a perspective showing an arrangement of parts adapted for use in laundries. Fig. 6 is a vertical section of a modified form. Fig. 7 is a section on the line $x'$ $x'$.

A fire-chamber is illustrated at A, it having the grate at $a$ and the ash-pit at $a'$. Horizontally opposite to the ash-pit there are air-chambers B B, which initially receive the air that is to be treated and used. They are provided with a series of registers or dampers at $b$ $b$ for regulating the entrance of the air.

C C indicate the air-pipes, which rise from the top walls of the said air-chambers, these pipes extending up to and communicating with the air-ducts D D. The products of combustion in their passage from the fire-chamber at A impart heat to the air-pipes C. In mechanisms of this sort as heretofore constructed the pipes C C, if made thin enough to be efficient, are attacked by the high heat to such an extent as to be rapidly destroyed. In the present construction these pipes are surrounded by jackets of water or by a common body of water.

$c$ $c$ represent bottom plates for receiving the lower ends of the pipes C, and $c'$ $c'$ are plates at the upper ends of these pipes, the last said plates preferably forming parts of the aforesaid air-ducts D D.

$c^2$ $c^2$ represent the exterior side walls, and $c^3$ the end walls, of the furnace, preferably joined to the aforesaid walls $c^2$ $c^2$. Inside of and parallel to these there are walls $c^4$ $c^5$, which at the lower and top edges are secured to diaphragms or walls $c^6$ $c^7$.

$E^2$ $E^2$ are pipes concentric with the aforesaid air-pipes C C and secured to the last said interior horizontal diaphragms $c^6$ $c^7$. The upper diaphragm $c^7$ is so arranged as to form, with the adjacent walls, chambers $E^5$ at the top, and the lower diaphragm, together with the adjacent parts, forms lower water-chambers $E'$ $E'$.

At $B'$ $B'$ there are walls between the lower part of the fire-chamber or the ash-pit and the side cold-air chambers. The water-chambers $E'$ $E^5$ communicate with a drum or boiler E at the top, lying between the hot-air ducts D D. The said air-ducts D D communicate at one end of the furnace with a chamber $D'$, which in turn communicates with a series of air-pipes $D^2$. The latter are situated directly in the fire-chamber and over the fire-bed. These pipes are made of cast-iron. They communicate with a chamber $D^3$, which is connected by a pipe $D^4$ with the cooler. The latter is indicated as a whole by F. As shown, it consists of a central cylindrical part with coned ends, the cylindrical part having diaphragms $f$ $f'$, in which are supported air-pipes $f^2$. The chamber in which these pipes lie is adapted to hold a body of water, which passes to it through the pipe G and escapes therefrom through the pipe $G'$. From the latter there extend branch pipes $g$ $g'$, communicating with the above-described water-chambers E', the inlets being at $e$ $e$. It will be seen that the pipes $g$ and $g'$ and the bottom water-chamber E' form a duct, which connects the water-pipe C with the water-chamber in the cooler at F.

H represents the discharge-pipe for the hot water. This is shown as being connected to a series of machines, such as are used in laundries for washing. The water in the chambers E' as it becomes heated rises from the level of the inlets at $e$ $e$ to the top, and is withdrawn as it is wanted.

I herein refer to the fact that the reheating-tubes $B^2$ communicate with the air-tubes C, meaning that the air passes from the latter to the former, and it may so pass more or less directly, as is desired.

By the sides of the fire-chamber there are provided bridge-walls $E^4$, these being made of sheets of iron riveted together and partially inclosing a chamber which communicates with the chamber E'. To permit the hot water to escape from these bridge-walls, pipes $e^3$ are employed, communicating with the chambers in the bridge-walls and also with the top water-chamber E. The interior water-chambers in these bridge-walls extend down to the grate, and all of the metal parts which are in proximity to the fire-bed, and are apt to be very highly heated, are protected by a water-jacket. The products of combustion rise from the fire-bed, pass over the bridge-walls $E^4$ and around the pipes $E^2$, and escape through pipes $E^6$ to a smoke-duct $E^7$, there being preferably one of these on each side communicating with a chimney or stack at $E^8$.

I have thus described in detail the construction and arrangement of the details which I prefer to use in embodying my improvements; but it will be understood that these can be modified, so that some features of the invention can be retained while others are omitted.

In another application, Serial No. 328,770, filed October 31, 1889, I have shown and described a form of air and water heating mechanism which is similar in some respects to the present one. It does not have the water jackets or chambers around the air-pipes; but it illustrates the fact that these air-pipes can be arranged at the sides of the fire-chamber in substantially the same way that they are arranged herein irrespective of their being surrounded by water.

At L and $L^3$ there are shown fans adapted to force the air in and exhaust it from the passages and chambers I have above described.

The top and bottom water-chambers may be of a size differing from those shown in the drawings—namely, that at E' and that at $E^5$. With a construction of this sort it will be seen that I fully protect all of the metal which is liable to be injured by the exceedingly high heat which I generally apply. The only parts which are apt to burn or be destroyed are the air-reheating pipes $D^2$, these being so situated as to receive the full force of the fire; but they are so arranged that they can be readily withdrawn and others substituted, if necessary.

It is now well known that if a body of air is to be utilized for drying purposes it can be made most efficient by subdividing it into a number of currents of relatively small diameter and applying to it a high degree of heat, a degree, in fact, higher than that at which it is intended to use it, in order to insure that every particle of it shall be thoroughly heated, and then before applying it to the articles to be desiccated lowering its temperature to the desired point, thus insuring a perfect uniformity of temperature throughout the whole mass. This is in contradistinction from the method of heating the air which consists in merely passing it in large volumes or currents of long transverse diameter over heated surfaces through large chambers or pipes and then delivering it to the articles to be dried.

It is also well known that the application of a high degree of heat to bodies of air results in the destruction of foreign matters, especially vitalized organic matter, which may be suspended therein, and that air freed therefrom is of superior quality for the desiccating of many materials, such as meats and the various foods. And, again, not only can the humidity of the air be relatively lowered in the manner herein provided for, but can be absolutely lowered if the surfaces of the air-ducts be heated to a sufficiently high point, as those at $D^2$ can be heated, so that it (the air) becomes thereby a still more efficient drying agent; but in either of the cases referred to it becomes necessary, after permitting the heat to do its work on the air, to lower the temperature of the air before applying it to the material to be dried, almost all of the substances which in the various arts are desiccated being treated with the best effects when the air is at a temperature neighboring upon 100° Fahrenheit; but much of the exceedingly high heat which I employ is in danger of being wasted, not only at points immediately in proximity to the fire-chamber, but also because of the above-described fact that after heating the air I withdraw more or less of the heat therefrom. This surplus or waste heat I make a second time available by conducting it into a body of water, which can be thereby raised to the boiling-point or to any desired degree.

In almost all of the establishments where materials are manufactured or treated which at one stage or another require desiccation use is made of engines or of boilers, and heretofore in such establishments two or more separate and independent fires have been employed, one for heating the water in such boiler and another in connection with the drying apparatus, and in consequence there has been such a waste of fuel that the desiccating processes have been found very expensive, and in many of the arts their respective materials, when manufactured or handled on large scale, are still submitted to the ordinary action of the elements, as the open air, solar heat, &c., for drying them. After the air reaches the tempering devices at F, its temperature will be lowered to an extent proportional to the quantity and character of the water or other tempering agent present in the chamber around the ducts $f^2$. If the air is heated up to several hundred degrees Fahrenheit, the water in the chamber will be heated considerably, and as this water is subsequently conveyed into the boiler or receptacle F the heat contained in it is utilized. The air which escapes from the tempering devices at F can be used for any of many purposes, as will be understood.

The mechanism, as shown, is particularly well adapted for automatically and efficiently preparing both the air and the water which are necessary for carrying on laundry operations on a large scale. The heated water can be used either for the generation of steam for driving machinery or can be conveyed to the tubs or receptacles wherein articles are washed, and the air delivered from the fan L can be forced in large volumes into the apartments where the articles are exposed for drying; but the great advantage possessed by the devices herein set forth for the particular purpose last referred to—namely, for heating the air and the water used in laundries—is that by means of them I have succeeded in doing away entirely with the large boilers commonly used in these places for the generation of steam.

In order that my invention when applied to laundry purposes may be fully understood, I will briefly call attention to the devices used in all laundries at present with which I am acquainted—that is, in those in which work is carried on to such extent as to require the presence of power machinery. First, large boilers are present, and correspondingly large furnaces for the purpose of generating sufficient steam to drive the machinery, to heat the washing-water, or to supply the dry-rooms or the pipes therein. The drying-rooms are closed compartments provided with coils or pipes to receive the steam from the boilers or the exhaust-steam from the engines, and the clothes are introduced and supported on sliding racks. The heat in these dry-rooms is high, at times intense, in order to effect the drying rapidly, and is necessarily so, owing to the principle of construction of the rooms and the principle involved in the drying operation. Again, the heat is exceedingly high throughout all of the rooms, owing to the proximity of the highly-heated boilers and the steam-pipes necessarily present.

With devices such as those I have herein shown in Fig. 5 (which illustrate the parts shown in detail in the other figures, in conjunction with others constituting a laundry-plant) it is possible to carry on all the necessary operations and yet avoid the exceedingly high heat which is experienced in laundries as they are at present constructed. A relatively low temperature can be maintained not only in the drying-room but throughout all the parts of the plant, as it is not necessary in any case to generate in the furnace a heat beyond that which is represented by the boiling-point, or thereabout. Of course the air is primarily heated to a higher point, but it is almost immediately thereafter cooled, as above described, the water being the medium for effecting this; and having thus provided for a large body of drying and ventilating air and a sufficient body of heated water the power necessary to actuate the various machines can be supplied from an electric motor, which as is well-known, dispenses with a highly-heated agency such as steam.

The air which I deliver to the drying-room is in a forced circulation, and therefore operates in a manner much superior to that in which the highly-heated steam-ducts act in a tightly-closed apartment. The temperature of this dry air being comparatively low its action on the articles of clothing (upon some articles particularly) is radically different from and better than the action of the exceedingly highly-heated contents (moisture-charged air) of the ordinary laundry drying-room.

As illustrated in Fig. 5, the suction-fan drives the air through the ducts L′ L′ into the drying-room O. The water is received from the outside main or other supply and carried through the pipe K′ to the inlet-pipe G and the tempering device F. There is a pipe at $k^5$ by which it can go direct to the pipe C and the boiler E, when it is desired to stop or modify the cooling action, and by means of the valves $k^3$ $k^4$ any desired temperatures of the air can be attained, as the amount of water passing through the cooler can be graduated as desired.

The electric motor is connected by shafts and belting with the fans at L, (and $L^3$, Fig. 7, when used,) and also with the washing-machines at N N, which receive the heated water.

Of course, as concerns the novel features of construction and arrangement of the parts of the heater and cooler or air and water tempering devices, the invention herein is not limited to a specific apparatus such as shown in Figs. 3, 4, and 5; but that particular construction and arrangement of the parts of a plant of that character possess many novel and desirable characteristics.

One of the important advantages incident to the construction herein shown and described is that the fire-chamber is practically separate from the other chambers or compartments—that is, it is so independent of them that no entrance into it is necessary in case repair is required in respect to any of the tubes. The vertical tubes or pipes are in chambers at the side of the fire-chamber, and therefore do not require access to it in case they need repairing or changing; and the air-tubes $D^2$ are placed horizontally, so that it is necessary only to open the doors in the walls of the chambers $D'$ $D^3$ in order to have all the necessary access. My experience with furnaces of the earlier sort used for treating air in drying apparatus, and in which the air-pipes were vertically arranged directly over the fire-chamber, has led me to see the difficulty and expense incident to them. The tubes rapidly burn and require frequent replacing, in fact to such an extent as to make them entirely too expensive for successful use; but with a furnace constructed on the plan herein described these difficulties and this expense are almost entirely obviated.

There are many features of the present invention which are independent of the presence of the water-jackets around the vertical air-pipes—that is to say, there can be modification in numerous respects without departing from all parts of the invention. In Figs. 6 and 7 I have shown a mechanism of one of such modified forms. Here the water from the air-tempering mechanism F passes directly to the upper boiler proper at E. The products of combustion pass out from the rear end of the fire-chamber through exits at $A^2$ and come directly in contact with the air-pipes C. As the air can be heated highly in the vertical tubes, the horizontal pipes, such as shown at $D^2$ $D^2$, Fig. 3, are not required. Both constructions—to wit, that in Figs. 1, 2, 3, and 4, and that in Figs. 6 and 7—are similar in the arrangement of the lower and the upper air-chambers, the vertical pipes, the heater E, and other parts in relation to the fire-chamber.

A construction similar to that in Figs. 6 and 7 is more fully shown and described in my said other application, Serial No. 328,770. The heater as a whole may be considered as made of three main parts—namely, the central fire-chamber and the two chambers at the sides of the fire-chamber—these side chambers being principally intended to receive and effect the heating of the air, they being divided up by the above-described horizontal and vertical partitions, whereby the air and the products of combustion (and the water when used) are kept separate; but the primary purpose of the side chambers is to accomplish therein the heating of the air. Each of the air-tubes is surrounded by a space through which the products of combustion pass. In Figs. 2, 3, and 4 this space is outside of the spaces occupied by the bodies of water in the pipes $E^2$, while in the form shown in Figs. 6 and 7 this space extends up to the air-tubes; but in both cases the air-tubes are heated because of the passage of the products of combustion through the space around them.

I do not herein claim any of the subject-matter constituting the claims in that application, but reserve the right to claim herein the novel and patentable matters common to the two applications, the present being a division of the former as regards the common matters.

What I claim is—

1. The combination, with the fire-chamber, of the water-heater directly above the fire-chamber and extending longitudinally thereof, the air-ducts, as at D D, extending longitudinally along the said water-heater, the air-tubes C, communicating with and extending downward from the chambers D D, the air-chambers B B below said tubes, and the passages across the bridge-walls for the entrance of the products of combustion into the space around the air-tubes, substantially as set forth.

2. The combination of the exterior walls, as at $c^2$, the interior walls $E^4$ $B'$, the grate and fire-chamber between the said walls $E^4$ $B'$, the lower chambers B between the vertical planes of the exterior walls $c^2$ and the vertical planes of the interior walls $E^4$ $B'$, the horizontal walls $c'$, the air-chambers D above the said walls $c'$, the air-tubes C, extending from the chambers B to the chambers D, the passages over the walls $E^4$, and the escape-passages $E^6$ through the exterior wall, substantially as set forth.

3. The combination, with the fire-chamber and the chambers at the right and the left of the fire-chamber, of the vertically-arranged air-tubes in the side chambers, the air-ducts at the top of the side chamber, the horizontally-arranged air-tubes in the fire-chamber, and chambers, as at $D'$ $D^3$, communicating with said horizontal air-tubes, substantially as set forth.

4. The combination, with the fire-chamber and the passages for the products of combustion, of the vertically-arranged water-pipes in said passages, the air-tubes within and surrounded by the water-pipes, and the water-chambers at the top and the bottom of the vertical water-pipes, substantially as set forth.

5. The combination, with the fire-chamber, the boiler above said chamber, and the upper air-chambers D, of the vertically-arranged air-tubes communicating with said air-chambers and situated in the path of the products of combustion, the bottom air-chambers communicating with said air-tubes, the vertical water-pipes respectively surrounding said air-tubes and communicating with said boiler, and means, substantially as described, for supplying water to and withdrawing it from the last said pipes, as set forth.

6. The combination, with the fire-chamber and the air-heating tubes at the right and the left of the fire-chamber, of the hollow bridge-walls and means, substantially as described, for supplying water to and withdrawing it from said walls, as set forth.

7. The combination, with the fire-chamber and the boiler above said chamber, of the hollow bridge-walls having interior chambers which extend down to the grate, the pipes communicating with the interior chamber in said bridge-walls and with said boiler, and means for supplying water to said bridge-walls, substantially as set forth.

8. The combination, with the fire-chamber, of the chambers for the products of combustion at the right and the left of the fire-chamber, the hollow bridge-walls on each side of the last said chamber, the air-tubes passing through the said chambers, and means for supplying water to and withdrawing it from the interior of the said hollow bridge-walls, said walls forming interior water-chambers extending down to the grate, substantially as described.

9. The combination, with the fire-chamber, of the air-tubes C, situated in the path of the products of combustion, the air-cooler communicating with said air-tubes, the water-chamber in the said cooler, the water-pipes $E^2$, respectively surrounding the aforesaid air-tubes, and the duct connecting the water-chambers in the cooler with the said water-pipes $E^2$, substantially as set forth.

10. The combination, with the fire-chamber, of the air-tubes C, situated in the path of the products of combustion, means for holding a body of water around each of the said tubes, and air-heating tubes $D^2$, communicating with the aforesaid air-tubes C and situated directly in the path of the products of combustion, substantially as set forth.

11. The combination, with the fire-chamber, of the chambers at the sides of the fire-chamber to receive the products of combustion, the air-tubes C, situated in the said side chambers, and the air-tubes $D^2$, connected, as described, with tubes C and situated in the fire-chamber, and a pipe $D^4$ for taking the air away from the tubes $D^2$, all arranged substantially as set forth, whereby the air initially passes through the water-jacketed tube C and then through the tubes $D^2$, substantially as set forth.

12. The combination, with the fire-chamber and the chambers at the sides of the fire-chamber to receive the products of combustion, of the vertically-arranged air-heating tubes in the said side chambers and the horizontally-arranged air-heating tubes $D^2$, communicating with those aforesaid and situated directly in the fire-chamber, substantially as set forth.

13. The combination of the fire-chamber, the boiler situated directly above the fire-chamber, the air-heating tubes on vertical lines other than the vertical lines of the fire-chamber, the upper air-collecting chambers arranged horizontally by the sides of the boiler and at the upper ends of the vertical tubes, the heating-chambers at the right and left of the fire-chamber and cut off from said upper air-collecting chambers, and the bottom air-chambers situated outside of the vertical planes of the fire-chamber and cut off from communication with the upper air-collecting chambers except through said tubes, substantially as set forth.

In testimony whereof I affix my signature in presence of two witnesses.

WILLIAM HENRY MURRAY.

Witnesses:
BENJAMIN V. JACKSON,
C. O. TEN BROCKE.